Dec. 17, 1957 W. J. ADAMIK 2,816,348
RESILIENT ELASTOMERIC ELECTRICAL INSULATING TAPE
Filed June 23, 1955
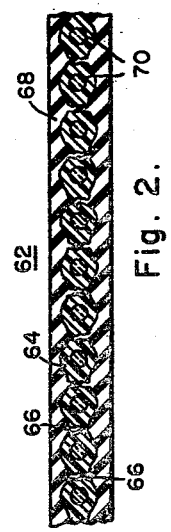
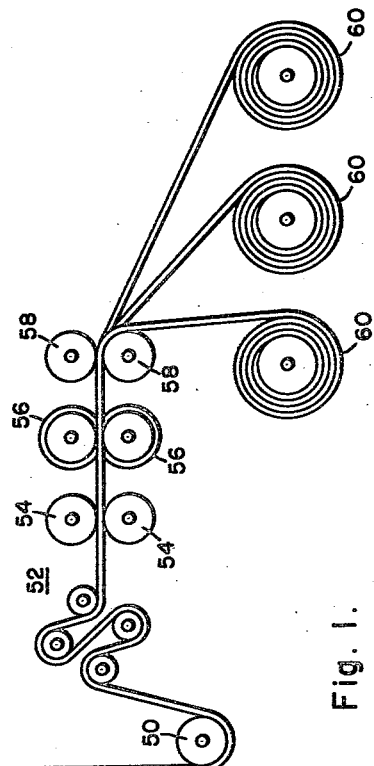
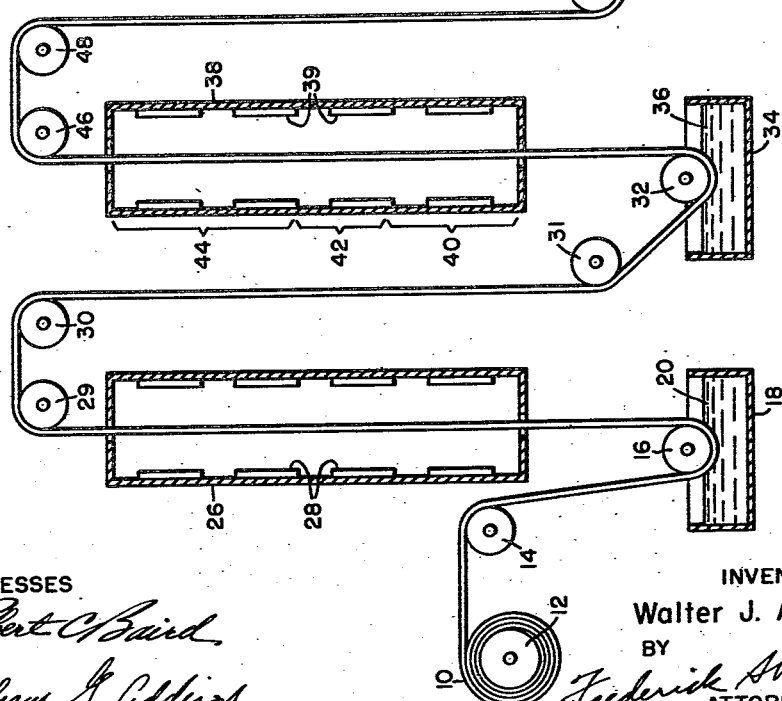
WITNESSES
Robert C. Baird
William G. Addison
INVENTOR
Walter J. Adamik.
BY
Frederick Shopoe
ATTORNEY United States Patent Office 2,816,348
Patented Dec. 17, 1957

2,816,348

RESILIENT ELASTOMERIC ELECTRICAL INSULATING TAPE

Walter J. Adamik, Trafford, Pa., assignor to Westinghouse Electric Corporation, East Pittsburgh, Pa., a corporation of Pennsylvania Application June 23, 1955, Serial No. 517,575

7 Claims. (Cl. 28—74)

The present invention relates to tapes and has particular reference to electrical insulating tapes having exceptionally high resilient and elastomeric properties at temperatures up to 180° C. and higher, and to processes for producing such tapes.

In the manufacture of electrical machinery it has been common practice to use varnished cambric tape as insulation in applications where it is necessary to tape around corners and uneven surfaces such as end windings, coils, and the like. Such varnished tapes constitute class A insulating materials with a maximum operating temperature of about 105° C.

Much electrical machinery now being manufactured is intended for use at class H operating temperatures of 180° C. and higher. There is, therefore, a need for an insulating tape which will function satisfactorily at such temperatures. To be completely satisfactory for such an application, the tape must not only withstand temperatures of 180° C. and higher, but it must also have good dielectric strength, resilience, and tensile strength at those temperatures.

Electrical insulating tapes have been prepared heretofore comprising a glass fabric backing member having an organopolysiloxane elastomer applied thereto. Such tapes satisfy certain of the requirements set forth hereinabove for a suitable insulating tape, but they do not have the resiliency required to permit repeated alternate elongation and relaxation whereby uniform taping around sharp corners and uneven surfaces may be obtained.

The tapes produced heretofore have not had a high degree of resiliency, or ability to be stretched, because they have been made with straight-weave glass fabric. In the manufacture of glass fabric, extremely fine glass filaments are wound into threads or strands which are then interwoven into a definite pattern. Glass fabric prepared in this manner in a straight-weave pattern is convenient to use in the manufacture of insulating tape because it can be pulled or otherwise passed through coating machinery and the like without any particular precautions being taken to prevent the threads from separating from one another and the fabric from pulling apart. In such straight-weave fabric one set of threads is parallel to the longitudinal axis of the fabric and the other set is at right angles thereto. The fabric also is usually bound along its edges so that the sheet of fabric may be pulled without any of the threads moving substantially from their predetermined configuration. It is this characteristic of the structure of straight-weave glass fabric which explains why insulating tapes made therewith have little, if any, ability to be stretched.

In bias-woven glass fabric, on the other hand, the threads usually are all at substantially 45° angles to both of the sides of the sheet, as well as the end edges of the fabric. In some bias-woven tapes and sheets the threads may be at angles of 30° to 60° to the sides. The edges are not bound and the threads will separate from one another if they are placed under substantial tension with the result that the fabric will ravel and can easily be pulled apart, particularly for narrow tapes.

The object of the present invention is to provide resilient, elastomeric electrical insulating tape comprising bias-woven glass fabric free from edge raveling and having a coating of a cured organopolysiloxane elastomer applied thereto, said tape being capable of being stretched longitudinally during application of the same to electrical apparatus whereby uniform taping around sharp corners and uneven surfaces of the apparatus may be achieved with excellent results.

A further object of the invention is to provide a process for preparing elastomeric insulating tape capable of withstanding temperatures of 180° C. and higher by applying sequentially, a binder coating to bias-woven glass fabric to set and maintain the threads in a bias weave configuration, applying a coating of an organopolysiloxane gel to the glass fabric, curing the siloxane gel to a solid elastomeric coating, and thereafter breaking the binder coating without rupturing the cured organopolysiloxane coating.

Other and further objects of the invention will, in part, be obvious and will, in part, appear hereinafter.

The foregoing objects are attained in an elastomeric insulating tape prepared from bias-woven glass fabric comprising interwoven threads formed of glass filaments. The filaments are coated with a size composition before being wound into threads. The size serves the dual function of reducing the abrasive action of the filaments on one another and also, to a limited extent, serves to hold the filaments together in the threads.

Insulating tapes are prepared from such fabric in accordance with this invention by applying a binder coating to the fabric in an amount sufficient to set and maintain the individual threads of the fabric in the bias weave configuration. A coating of an organopolysiloxane gel then is applied to at least one side of the fabric which then is heated to cure the same to an elastomer which adheres tenaciously to said fabric. Thereafter, the fabric is placed under a tension sufficient to break the binder coating without breaking or harming the coating of cured organopolysiloxane elastomer whereby the individual threads of the fabric are released from the set configuration originally maintained by the binder. The fabric then is cut into tapes of suitable widths, the coating of cured organopolysiloxane elastomer permitting the tape to be alternately elongated and relaxed and serving to bond the tape into a unitary whole.

For a more complete understanding of the present invention, reference is made to the following description taken in conjunction with the accompanying drawing wherein:

Figure 1 is a schematic illustration, partly in cross section, of apparatus suitable for use in preparing continuously the insulating tape of this invention, and Fig. 2 is a view in cross section of a length of electrical insulating tape prepared in accordance with this invention.

Looking first at Fig. 1 of the drawing, reference numeral 10 refers to a roll of glass fabric mounted on a roller 12. The fabric is a bias-woven glass fabric having interwoven threads formed of glass filaments coated with a size. The size may comprise starch, gelatin, an amine, a resin such as a silicone varnish, or a vegetable oil in any desired admixture. A widely used size comprises a mixture of starch and vegetable oil. The fabric is approximately 36 inches wide. Fabric of a smaller or larger width may be used as desired.

The fabric first enters a thread setting zone by passing over rollers 14 and 16 and into a tank 18 wherein it is coated with a thin coating of a liquid binder 20 which is heat treatable to a solid state. The glass fabric coated with the liquid binder emerges from tank 18 and passes through an oven 26 provided with heating elements 28 wherein a temperature suitable for curing the liquid binder to a thin solid coating is maintained.

The liquid binder serves to set the individual threads of the fabric in a bias weave configuration and comprises material which is compatible with organopolysiloxanes. Examples of particular materials which are suitable for use as the binder include starch, vegetable oils, polyvinyl acetate, oil modified phenolic resins, phenyl methyl siloxanes, and the like.

In practice it has been found that best results are secured when the amount of the binder present on the glass fabric varies from about 3% to 15% by weight of the glass fabric. If substantially less than 3% by weight of binder is present, the advantages of the invention are not attained because the threads separate from one another and the fabric breaks apart during subsequent processing. A substantially greater amount of binder than 15% by weight results in blistering of the binder during subsequent heat treatment.

The fabric with the binder coating thereon then passes over guide rollers 29, 30, and 31 into a gel coating zone. In entering this zone the fabric passes beneath a roller 32 which is suspended in a vat 34 containing a fluid mixture 36 consisting of an organopolysiloxane gel in one or more organic solvents, such as toluene, xylene, naphtha or the like. A coating of the organopolysiloxane gel is applied to both sides of the glass fabric as it leaves vat 34.

The coated fabric then enters a heating zone, passing progressively through a drying and curing tower 38 provided with heating elements 39. Tower 38 has three zones, namely, a lower zone, as indicated at 40, which is approximately 10 feet in length in which the temperature varies from about room temperature (25° C. to 35° C.) in its lower region to about 80° C. at its upper region; an intermediate zone, as indicated at 42, which is about 7 feet in length in which the temperature varies from about 80° C. in the lower region to about 135° C. in the upper region; and an uppermost zone, as indicated at 44, which is about 14 feet in length in which the temperature varies from 135° C. to 290° C. from its lower to upper region.

The fabric passes through the tower 38 at a rate of about 1½ feet per minute, during which period of time the coating of the organopolysiloxane gel is cured to an elastomeric solid which adheres tenaciously to both sides of the glass fabric.

The amount of organopolysiloxane gel applied to the glass fabric may vary within relatively wide limits. Thus, the gel may be applied in amounts such that the layer of the cured organopolysiloxane may vary from about 0.5 mil to about 40 mils in thickness on either or both sides of the glass fabric. Tapes having a cured siloxane coating of from about 1.5 to 5 mils on each side of the glass fabric are particularly suitable for use in taping around sharp corners and uneven surfaces to provide a uniform insulating coating on electrical equipment.

Upon leaving the tower 38, the organopolysiloxane elastomer coated glass fabric passes over rollers 46 and 48, each of which rollers contains circulating cold water which cools the fabric and cured organopolysiloxane coating. The cooled fabric then enters a finishing zone by passing beneath roller 50 and thence through an associated series of rollers 52 which maintain the siloxane coated fabric under a predetermined tension sufficient to break or release the binder coating applied to the fabric in the thread setting zone. Such tensioning stretches the fabric longitudinally and fractures the binder coating whereby the individual threads of the fabric are released from the set configuration originally maintained by the binder. The fabric itself does not break apart, however, since it is bound into a unitary whole by the tenaciously adhering coating of the cured elastomeric organopolysiloxane.

The fabric may be placed under the tension required to break the binder in any convenient and suitable manner. In the apparatus illustrated in the drawing, this is accomplished by driving rollers 54 at a greater speed than roller 50 is driven.

In practice, it has been found that best results are obtained when the fabric is placed under a tension of from about 5 pounds up to about 60 pounds per inch of width of the fabric. If substantially less than 5 pounds tension is applied the binder coating is not completely disrupted or released. A tension of more than 60 pounds for each inch of fabric width may tear or fracture the elastomer coating on the tape.

The fabric with released binder then passes between cutting rollers 56 which cut the fabric into a plurality of tapes of desired widths, each of which tapes passes between guide rollers 58 and then is wound on separate take-up rollers 60.

Looking next at Fig. 2, there is illustrated a length of tape 62 prepared in accordance with this invention. In the tape illustrated the binder coating 64 of the glass fabric 10 has been released or broken as illustrated at 66, and, as illustrated on the drawing, the cured organopolysiloxane coating 68 has penetrated between the threads 70 of fabric 10 to bond the tape into a unitary body.

The organopolysiloxane gel introduced into vat 34 comprises a siloxane gum or gel which is curable or vulcanizable to an elastomeric siloxane on heating. The siloxane gums or gels are compounds comprising essentially silicon atoms connected to each other by oxygen atoms through silicon-oxygen linkages, having the characteristic structure —Si—O—Si—, and having an average of from 1.75 to 2.25 monovalent organic radicals attached through carbon-silicon linkages to each silicon atom. Good results have been secured with siloxane gels or gums in which the majority, if not all, of the monovalent organic radicals are methyl radicals. A gum having a minor proportion of phenyl radicals, preferably present as diphenyl silicon-oxide groups $$-\underset{\underset{C_6H_5}{|}}{\overset{\overset{C_6H_5}{|}}{Si}}-O-$$

gives good results. While it is preferable, although not necessary, that the organosiloxane compounds have a high molecular weight, they should not have attained a degree of polymerization such that they are no longer soluble in common solvents, such as toluene. At least 60% of the units present in the siloxane should correspond to the empirical formula RR'SiO where R and R' represent monovalent alkyl radicals.

The siloxane elastomer may be prepared by hydrolyzing a dialkyl silane or a mixture of a dialkyl and a diphenyl silane, the silanes containing an average of approximately two readily hydrolyzable groups per silicon atom. Typical readily hydrolyzable groups are halogens, for example, chlorine or fluorine; alkoxides, for example, methoxy and ethoxy; and amino groups. While it is preferred that the alkyl group attached to silicon be methyl, because of the outstanding qualities of dimethyl siloxane elastomers, other monovalent organic groups, such as ethyl, propyl, amyl and the like, may be present.

Upon hydrolysis of the dialkyl silane or mixed dialkyl silane and diaryl silane, there results oily siloxane type polymers in which a majority of the units have the structure $$-\underset{\underset{R}{|}}{\overset{\overset{R}{|}}{Si}}-O-$$

These oily siloxane polymers, for example, a dimethyl siloxane oil, may be treated with various agents to convert them to elastomeric gels or gums. Suitable examples of such agents include ferric chloride, concentrated sulfuric acid, sulfuryl chloride, sulfuryl bromide, sulfuryl fluoride, phenyl phosphoryl dichloride, and alkoxy phosphoryl dihalides as set forth in Patents Nos. 2,469,883 and 2,472,629. The elastomeric gels or gums also may be produced in other known ways, as by treating the oils with an acyl peroxide as set forth in Patents Nos. 2,460,- 795 and 2,481,052. Such gels or gums are essentially plastic or pasty and may be further cured to a true elastomer by adding an acyl peroxide and heating.

It is desirable to add finely divided fillers to the silicone gels or gums before they are converted to elastomers. Heat resistant inorganic compounds are preferred for this purpose. Examples thereof include asbestos, clay, barium titanate, iron oxide, bentonite, zinc oxide, lithopone, titania, magnesia, graphite, slate, mica, diatomaceous earth, calcium carbonate, lead oxide, alumina, and calcium silicate.

Acyl peroxides suitable for converting the siloxane gums or gels to elastomers contain at least one aromatic acyl radical. Examples of such peroxides are benzoyl peroxide, benzoyl acetyl peroxide, dinaphthoyl peroxide, and benzoyl lauryl peroxide. The acyl radical in such peroxides may contain an inorganic substituent such, for example, as a halogen or a nitro group. The amount of acyl peroxide employed to convert a silicone gel or gum to an elastomer ordinarily need not exceed 10% of the weight of the silicone oil or gel, with 2% to 4% generally being sufficient. The total amount of the peroxide need not be added at one time but may be added by increments during the milling or masticating of the gum or gel with inorganic fillers.

The amount of the organic filler to be incorporated in the elastomer may be varied over a wide range of proportions. As little as 25 parts of the inorganic filler per hundred parts of the silicone gel will produce good results. Ordinarily, however, the amount of the finely divided filler will vary from 100 parts to 200 parts and more for each 100 parts of the siloxane gel.

The siloxane gel with fillers and peroxide catalysts, previous to passage through tower 38 wherein they are cured, may be applied to the bias woven glass fabric in any suitable manner. Thus, as illustrated in the accompanying drawing, the silicone gel may be applied by dipping. In addition to dipping, other coating processes such as knife coating, roller coating, brush coating and spray coating may be used. It is preferable to disperse the gels or gums in a suitable solvent such as toluene, xylene, naphtha, and the like when it is desired to apply the coating by spraying, dipping or brushing.

Instead of curing the siloxane gel to an elastomer by adding a catalyst to the siloxane gel and then heating in tower 38, the gel may be cured by exposing the same to electron irradiation as described in copending application Serial No. 510,668, filed May 24, 1955, and now abandoned, which is assigned to the same assignee as the present invention. In the latter instance, peroxide catalysts are not used.

Siloxane gum or gel may be applied to both sides of the fabric or to only one side. When applied to only one side as by a calendering or knife coating process, a pressure sensitive adhesive may be applied to the other side in accordance with the procedure described in copending application Serial No. 457,199, which is assigned to the same assignee as the present invention. A suitable elastomeric pressure sensitive adhesive material which may be employed is dimethyl silicone. Examples of particularly satisfactory pressure sensitive materials include those products manufactured by the Dow Corning Company and designated as "XC-269," "XC-270" and "XC-271."

To indicate more fully the nature and capabilities of the electrical insulating tape of this invention, the following specific examples are set forth.

EXAMPLE I

A sheet of sized bias woven glass fabric about 36 inches in width having a thickness of .004 inch was treated to apply a binder coating of an oil modified phenol-formaldehyde resin thereto in a quantity amounting to about 10% by weight of the fabric after baking at 150° C. The sheet of glass fabric then was passed through a vat containing a liquid composition comprising 100 parts by weight of a dimethyl siloxane gel, 50 parts by weight of calcium carbonate, three parts by weight of benzoyl peroxide, and a solvent mixture of 100 parts by weight of toluene and 50 parts by weight of naphtha. The siloxane coated glass fabric was passed through a curing tower, similar to tower 38 illustrated in the accompanying drawing, at a rate of 1½ feet per minute. The siloxane gel was found to be converted to a solid elastomer on emergence from the curing tower.

A section of the fabric thus prepared was cut into 1 inch wide tapes. These tapes, with the binder coating still intact, were subjected to a series of tests to determine mechanical and electrical properties. The results of these tests are set forth in the following table.

Table I

Tensile strength, pounds per inch width:
    (a) Coated glass tape_____ 99
    (b) Jointed selvages_____ 61
Dielectric strength, volts per mil, Short Time Method, ¼ inch dia. electrodes:
    (a) As received_____ 695
    (b) 15 min. immersion in hot oil at 100° C__ 860
    (c) 15 min. immersion in hot petrolatum at 150° C _____ 875
    (d) At 6% stretch_____ 587
    (e) At 12% stretch_____ 514
    (f) 96 hrs., at 23° C., at 96% rel. humidity__ 574
    (g) After 168 hrs., at 250° C. in air_____ 532
    (h) After 168 hrs., at 250° C. in air, then bent 180° over ⅛ inch dia. mandrel_____ 500
Abrasive resistance, grams to scrape using Hoffman tester:
    (a) As received_____ 200
    (b) 15 min. immersion in hot oil at 100° C__ 140
    (c) 15 min. immersion in hot petrolatum at 150° C_____ 420
Moisture absorption, percent: (a) 96 hrs., at 23° C. at 0% rel. humidity then 96 hrs., at 23° C. at 96% rel. humidity_____ 0.85

EXAMPLE II

Another section of the fabric, prepared as described in the first paragraph of Example I, was passed through an associated series of rollers and placed under a tension of about 340 pounds (about 9.5 lbs. per lineal inch of width) to break the binder coating in the fabric without breaking or injuring the coating of cured elastomeric organopolysiloxane. The fabric, with the binder broken, then was cut into one inch wide tapes which were subjected to the same tests as indicated for the tape having an unbroken binder, in Example I. The results of these tests are set forth in the following table.

Table II

Tensile strength, pounds per inch width:
    (a) Coated glass tape_____ 105
    (b) Jointed selvages_____ 52
Dielectric strength, volts per mil, Short Time Method, ¼ inch dia. electrodes:
    (a) As received_____ 664
    (b) 15 min. immersion in hot oil at 100° C__ 750
    (c) 15 min. immersion in hot petrolatum at 150° C_____ 716
    (d) At 6% stretch_____ 607
    (e) At 12% stretch_____ 535
    (f) 96 hrs., at 23° C. at 96% rel humidity___ 585
    (g) After 168 hrs., at 250° C_____ 540
    (h) After 168 hrs., at 250° C. then bent 180° over ⅛ inch dia. mandrel_____ 520

Abrasive resistance, grams to scrape using Hoffman tester:
 (a) As received _____ 220
 (b) 15 min. immersion in hot oil at 100° C___ 160
 (c) 15 min. immersion in hot petrolatum at 150° C_____ 375
Moisture absorption, percent: (a) 96 hrs., at 23° C. at 0% rel. humidity then 96 hrs., at 23° C. at 96% rel. humidity_____ 0.98

EXAMPLE III

A sheet of sized bias woven glass fabric about 36 inches wide having a thickness of about 0.004 inch was treated to apply a binder of an oil modified phenol-formaldehyde resin thereto in a quantity amounting to about 10% by weight of the fabric after baking at 150° C. A siloxane gum comprising 100 parts by weight of a dimethyl siloxane gel admixed with 100 parts by weight of calcium carbonate and three parts by weight of benzoyl peroxide was calendered into one face of the glass fabric. The siloxane coated fabric was passed through a heating tower to cure the gel to an elastomer. The fabric then was placed under a tension of about 340 pounds (about 9.5 pounds per lineal inch of width) to break the binder coating on the fabric without breaking or injuring the coating of cured elastomeric organopolysiloxane. A pressure sensitive siloxane adhesive comprising a product marketed by the Dow Corning Company designated as "XC-269" then was applied to the fabric. The fabric then was cut into tape which could be rolled and then unrolled without difficulty, yet, when applied to coils, adhered to itself tenaciously.

The insulating tapes of this invention have more resiliency than do tapes in which the binder coating is not broken. Because of this resiliency, the tapes of this invention may be wrapped smoothly and uniformly around corners and over uneven surfaces of electrical apparatus.

Operators who wrap tapes about electrical apparatus generally stretch the tape during wrapping, applying pressures normally of about 2 to 3 pounds per lineal inch of tape width. The tapes of this invention may be wrapped snugly and uniformly about electrical equipment since these tapes will elongate under such pressures and will then spring back, due to their resiliency, and tightly grip the apparatus after the pressure is released.

Tapes wherein the binder coating is intact do not have these resiliency characteristics and it is impossible, therefore, to obtain uniform snug taping around corners and over uneven surfaces when such tapes are wrapped at pressures of 2 to 3 pounds per lineal inch of tape width.

If, when wrapping with tapes in which the binder coating is still intact, pressures greater than 5 pounds per lineal inch of tape width are used, the binder coating will break. Uneven taping still will result, however, since the tape will bunch at corners and on uneven surfaces.

Smooth uniform taping of electrical apparatus as hereindescribed is obtainable only when using the tapes of this invention wherein the binder coating is broken uniformly during the process of manufacturing the tape.

While the present invention has been described with reference to particular embodiments thereof, it will be understood, of course, that certain changes, substitutions and modifications may be made therein without departing from its true scope.

I claim as my invention:

1. A process for preparing a resilient, elastomeric insulating tape from bias woven glass fabric having interwoven threads formed of glass filaments coated with a size, which comprises applying to said glass fabric a thin binder coating in an amount sufficient to set and maintain the individual threads of the fabric in a predetermined bias weave configuration, applying a coating of organopolysiloxane gel to at least one side of the fabric, heating the organopolysiloxane gel to cure the same to an elastomer which adheres tenaciously to said fabric, and thereafter placing the fabric under tension of from 5 pounds up to about 60 pounds per inch width of the fabric to break the binder coating therein without breaking the coating of cured organopolysiloxane whereby the individual threads are released from the predetermined set configuration originally maintained by the binder, and cutting the fabric into tapes of suitable widths, the coating of cured organopolysiloxane elastomer permitting the tapes to be alternately elongated and relaxed and serving to bond the tape into a unitary whole.

2. A process as set forth in claim 1 wherein a coating of organopolysiloxane gel is applied to both sides of said glass fabric.

3. A process as set forth in claim 1 wherein a coating of said organopolysiloxane gel is applied to one side only of said glass fabric and a layer of a pressure sensitive adhesive is applied to the other side of said glass fabric.

4. A continuous process for the treatment of bias woven glass fabric having interwoven threads formed of glass filaments coated with a size, said process comprising the steps of: continuously and sequentially moving the glass fabric through a thread setting zone, a gel coating zone, a heating zone, and a finishing zone; applying a binder coating to said glass fabric in said thread setting zone to set the individual threads of the fabric in said bias weave configuration which is maintained throughout passage of said fabric through said gel coating zone and into said heating zone, said binder comprising a liquid which is compatible with an organo-polysiloxane and being applied in a quantity amounting to 3% to 15% by weight of the fabric; applying a coating of an organopolysiloaxane gel to said fabric while it is passing through said gel coating zone; applying heat to said gel coating while the fabric is progressively moving through said heating zone to convert said gel to a solid elastomeric coating which adheres tenaciously to said fabric; elongating the fabric in said finishing zone under a tension of from 5 pounds up to 60 pounds per inch width of the fabric to break said binder without breaking the coating of cured organopolysiloxane whereby the individual threads are released from the set configuration originally maintained by the binder; and continuously cutting the finished fabrics into tapes, the coating of cured organopolysiloxane elastomer permitting the tape to be alternately elongated and relaxed and serving to bond the tape into a single unit.

5. A heat treated tape structure suitable for use as an electrical insulator comprising, in combination, a layer of glass fabric in which the threads thereof are woven into a bias weave configuration, a discontinuous binder coating applied to the fabric and surrounding a substantial portion of the individual threads, and a coating of a cured organopolysiloxane elastomer applied to at least one side of said glass fabric and penetrating between the individual binder coated threads, the elastomeric coating permitting the tape to be alternately elongated and relaxed and serving to bond the tape into a unitary whole.

6. An elastomeric insulating tape as set forth in claim 5 wherein a coating of said organopolysiloxane gel is applied to both sides of said glass fabric.

7. An elastomeric insulating tape as set forth in claim 5 wherein a coating of said organopolysiloxane gel is applied to one side of said glass fabric and a layer of a pressure sensitive adhesive is applied to the other side of said glass fabric.

References Cited in the file of this patent

UNITED STATES PATENTS

| | | |
|---|---|---|
| 1,267,025 | Weinheim | May 21, 1918 |
| 1,276,731 | Crowell | Aug. 27, 1918 |
| 2,707,318 | O'Donnell | May 3, 1955 |
| 2,708,289 | Collings | May 17, 1955 |
| 2,737,701 | Hubbard et al. | Mar. 13, 1956 |
| 2,753,284 | Pahl et al. | July 3, 1956 |